United States Patent
Fukumura

(10) Patent No.: US 7,006,942 B2
(45) Date of Patent: Feb. 28, 2006

(54) SENSOR MANAGEMENT SYSTEM AND COMPUTER-READABLE MEDIUM FOR SENSOR MANAGEMENT PROGRAM

(75) Inventor: Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 629 days.

(21) Appl. No.: 10/196,464

(22) Filed: Jul. 16, 2002

(65) Prior Publication Data
US 2003/0057356 A1 Mar. 27, 2003

(30) Foreign Application Priority Data
Sep. 27, 2001 (JP) ............ P.2001-297680
Sep. 27, 2001 (JP) ............ P.2001-297681

(51) Int. Cl.
G06F 19/00 (2006.01)

(52) U.S. Cl. .................. 702/122; 356/218

(58) Field of Classification Search ........ 702/122, 702/117, 118, 182–185; 356/606, 450, 213, 356/218
See application file for complete search history.

(56) References Cited

U.S. PATENT DOCUMENTS
6,735,630 B1 * 5/2004 Gelvin et al. ............ 709/224

* cited by examiner

*Primary Examiner*—Edward Raymond
(74) *Attorney, Agent, or Firm*—Kilyk & Bowersox, P.L.L.C.

(57) ABSTRACT

Pluralities of sensor blocks are provided to one system. A photoelectric sensor management system is connected selectively to a communication unit of one sensor block via a cable. A photoelectric sensor management program in the photoelectric sensor management system displays a set window and a monitor window on a screen. The set window is displayed to set the information such as set values of amplifiers included in a plurality of sensor blocks. The monitor window is displayed to monitor the information such as current set values, current values, etc. of respective amplifiers included in the sensor block that is connected currently.

20 Claims, 10 Drawing Sheets

FIG. 4

MONITOR WINDOW — 52

| AMPLIFIER INFORMATION | BLOCK 1 | X182 | SCREW DETECTION (2) | A3 | B3 | R3 |

MONITOR

AMPLIFIER MONITOR — 521

SET VALUE  1200   ▲▼ CURRENT VALUE

[SET] OFF

DISPLAY MODE
- ○ SET VALUE/CURRENT VALUE  ○ BAR/CURRENT VALUE
- ● %/CURRENT VALUE  ○ PEAK VALUE/BOTTOM VALUE
- ○ PEAK VALUE(%)/BOTTOM VALUE(%)

OPERATION MODE
- ○ LIGHT SHIELDING ON
- ● LIGHT INPUT ON

☐ KEY ROCK   [PEAK CLEAR]

AMPLIFIER LIST — 522

| X180 | RESIDUAL AMOUNT DETECTION |
| X181 | SCREW DETECTION (1) |
| X182 | SCREW DETECTION (2) |

PARAMETER

FUNCTION LEVEL
- ○ EASY
- ● PRO

☐ EASY ROCK

| OPERATION MODE | ULTRA ▶ | APC | OFF ▶ |
| TIMER | OFF-DELAY ▶ | DEFF | OFF ▶ |
| TIMER TIME | 5 ▲▼ | | |

| DISPLAY LEVEL | FULL ▶ |
| ECO | OFF ▶ |
| SHIFT DISPLAY | OFF ▶ |
| SHIFT AMOUNT | 100 ▲▼ |

[CLOSE]

SENSOR MANAGEMENT SYSTEM AND COMPUTER-READABLE MEDIUM FOR SENSOR MANAGEMENT PROGRAM

BACKGROUND OF THE INVENTION

1. Field of the Invention

The present invention relates to a sensor management system and a computer-readable medium including a sensor management program connectable to a sensor group including a sensor.

2. Description of the Related Art

In the related art, photoelectric sensors are used to sense moving subjects on a production line in the factory, etc. The photoelectric sensor senses a presence of a subject by projecting a light to a conveyer route of the subject and then sensing a reflected light from the subject or a transmitted light.

According to a transmission photoelectric sensor, if a to-be-sensed subject is not present in a sensing area, the light being projected from a light projecting portion can enter into a light receiving portion. In this case, it is decided that, if a level of a quantity of a received light in the light receiving portion is lower than a set value (threshold value), the to-be-sensed subject is present in the sensing area. In contrast, according to a reflection photoelectric sensor, if the to-be-sensed subject is present in the sensing area, the light being projected from the light projecting portion can enter into the light receiving portion. In this case, it is decided that, if the level of the quantity of the received light in the light receiving portion is higher than the set value (threshold value), the to-be-sensed subject is present in the sensing area. The sensitivity of the photoelectric sensor can be changed by adjusting the set value.

If the subject is sensed inplural directions or at plural positions, pluralities of photoelectric sensors are employed. Sense signals that are output from the plurality of photoelectric sensors are supplied to a system such as a programmable controller, for example.

In order to know the states of the set values of respective photoelectric sensors, a current quantity of received light, etc., individual photoelectric sensors must be checked. Further, an information such as the set value, etc. must be set previously in the photoelectric sensor. In the above system using a plurality of photoelectric sensors, it takes much time to check respective states of a plurality of photoelectric sensors, and also such check is very troublesome.

SUMMARY OF THE INVENTION

It is an object of the present invention to provide a sensor management system and a computer-readable medium including a sensor management program capable of monitoring easily states of the sensors included in a sensor group in real time.

It is another object of the present invention to provide the sensor management system and a computer-readable medium including a sensor management program capable of setting easily information into sensors included in the sensor group and also updating easily such set information.

A sensor management system according to the invention, which can be connected to a sensor group including a plurality of sensors, comprises a selecting means for selecting any sensor of a sensor group connected to the sensor management system; a communicating means for communicating with the sensor selected by the selecting means to acquire information set to define an operation of the sensor and information indicating an operation state of the sensor as sensor information; and a displaying means for displaying the sensor information acquired by the communicating means.

In the sensor management system according to the present invention, any sensor of the sensor group connected to the sensor management system is selected by the selecting means, and the information set to define the operation of the sensor and the information indicating the operation state of the sensor are acquired by the communicating means as the sensor information via the communication with the selected sensor. Then, the acquired sensor information is displayed by the displaying means.

Therefore, the states of individual sensors of the sensor group can be easily monitored in real time.

In the configuration of the sensor management system according to the first invention, the sensor management system according to the second invention further comprises an updating means for updating the information set to the sensor out of the sensor information displayed by the displaying means; and wherein the communicating means transmits the information updated by the updating means to the sensor.

In this case, the information set to the sensor out of the sensor information displayed by the displaying means are updated by the updating means, and the updated information are transmitted to the sensor by the communicating means.

Therefore, the information set to the individual sensor of the sensor group can be easily updated.

In the configuration of the sensor management system according to the first or second invention, the sensor management system according to the third invention, the communicating means acquires identification information, which identifies the sensor of the sensor group connected to the sensor management system, via communication, the displaying means displays the identification information acquired by the communicating means, and the selecting means selects any sensor of the sensor group based on the identification information displayed by the displaying means.

In this case, the identification information, which identifies the sensor of the sensor group connected to the sensor management system, is acquired via the communication by the communicating means. The acquired identification information is displayed by the displaying means, and any sensor of the sensor group is selected based on the displayed identification information.

Therefore, the sensor of the sensor group being connected currently to the sensor management system can be easily identified, and the sensor to be monitored can be easily selected.

A sensor management program according to the invention, which can be read by a computer being connected to a sensor group including a plurality of sensors, the sensor management program causes the computer to execute a process of selecting any sensor of a sensor group connected to the sensor management system; a process of communicating with the selected sensor to acquire information set to define an operation of the sensor and information indicating an operation state of the sensor as sensor information; and a process of displaying the acquired sensor information.

According to the sensor management program of the present invention, any sensor of a sensor group connected to the sensor management system connected to the computer is selected, and the information set to define the operation of the sensor and the information indicating the operation state of the sensor are acquired as the sensor information via the communication with the selected sensor. Then, the acquired sensor information is displayed.

Therefore, the states of individual sensors of the sensor group can be easily monitored in real time.

In the sensor management program according to the fourth invention, the sensor management program according to the fifth invention, the sensor management program further causes the computer to execute a process of updating the information set to the sensor out of the displayed sensor information; and a process of transmitting the updated information to the sensor.

In this case, the information set to the sensor out of the displayed sensor information is updated, and the updated information is transmitted to the sensor.

Therefore, the information set to the individual sensor of the sensor group can be easily updated.

In the sensor management program and the sensor management program according to the invention, the selecting process includes a process of acquiring identification information, which identifies the sensor of the sensor group connected to the sensor management system, via communication, a process of displaying the acquired identification information, and a process of selecting any sensor of the sensor group based on the displayed identification information.

Therefore, the sensor of the sensor group being connected currently to the sensor management system can be easily identified, and the sensor to be monitored can be easily selected.

A sensor management system according to the invention, which can be connected to a sensor group including of a plurality of sensors, comprises a storing means for storing information set to define operations of a plurality of sensors of the sensor group as set information; a displaying means for displaying the set information of the plurality of sensors of the sensor group stored in the storing means; an updating means for updating the set information displayed by the displaying means and updating the set information stored in the storing means; and a communicating means for transmitting the set information displayed by the displaying means to the plurality of sensors of the sensor group.

In the sensor management system according to the present invention, the information set to define operations of a plurality of sensors of the sensor group are stored in the storing means as set information. Then, the set information of a plurality of sensors of the stored sensor group is displayed by the displaying means. The displayed set information and the stored set information are updated by the updating means. The displayed set information is transmitted to the plurality of sensors of the sensor group by the communicating means.

Therefore, the set information can be set collectively into a plurality of sensors of the sensor group, and also the set information being set can be easily updated.

In a configuration of the sensor management system according to the first invention, the sensor management system according to the second invention, the sensor management system is connected to a set or plural sets of sensor groups, the storing means stores the set information of one set or plural sets of sensor groups every set of sensor groups, the displaying means displays the set information of a selected set of sensor groups out of one set or plural sets of sensor groups stored in the storing means, and the communicating means transmits collectively the set information of a set of sensor group displayed by the displaying means to the sensor group.

In this case, the set information of one set or plural sets of sensor groups are stored by the storing means every set of sensor groups. The set information of the selected set of sensor groups out of one set or plural sets of stored sensor groups is displayed by the displaying means. The set information of a set of displayed sensor group is transmitted collectively to the sensor group by the communicating means.

Therefore, the set information of any sensor group out of the set information of one set or plural sets of stored sensor groups can be selected and then transmitted collectively to the sensor group.

A sensor management program according to the invention, which can be read by a computer being connected to a sensor group including a plurality of sensors, causes the computer to execute a process of storing information set to define operations of a plurality of sensors of the sensor group as set information; a process of displaying the set information of the plurality of sensors of the stored sensor group; a process of updating the displayed set information and updating the stored set information; and a process of transmitting the displayed set information to the plurality of sensors of the sensor group.

According to the sensor management program of the present invention, the information set to define operations of a plurality of sensors of the sensor group are stored as the set information. Then, the set information of the plurality of sensors of the stored sensor group is displayed. The displayed set information and the stored set information are updated. The displayed set information is transmitted to a plurality of sensors of the sensor group.

Therefore, the set information can be set collectively into a plurality of sensors of the sensor group, and also the set information being set can be easily updated.

In the sensor management program according to the invention, in the sensor management program according to the fourth invention, the computer is connected to a set or plural sets of sensor groups, the storing process includes a process of storing the set information of one set or plural sets of sensor groups every set of sensor groups, the displaying process includes a process of displaying the set information of a selected set of sensor groups out of one set or plural sets of stored sensor groups, and the transmitting process includes a process of transmitting collectively the set information of a set of displayed sensor group to the sensor group.

In this case, the set information of one set or plural sets of sensor groups are stored every set of sensor groups. The set information of the selected set of sensor groups out of one set or plural sets of stored sensor groups is displayed. The set information of a set of displayed sensor group is transmitted collectively to the sensor group.

Therefore, the set information of any sensor group out of the set information of one set or plural sets of stored sensor groups can be selected and then transmitted collectively to the sensor group.

BRIEF DESCRIPTION OF THE DRAWINGS

FIG. 4 is a view showing an example of a monitor window;

DETAILED DESCRIPTION OF THE PREFERRED EMBODIMENTS

Figure 1:
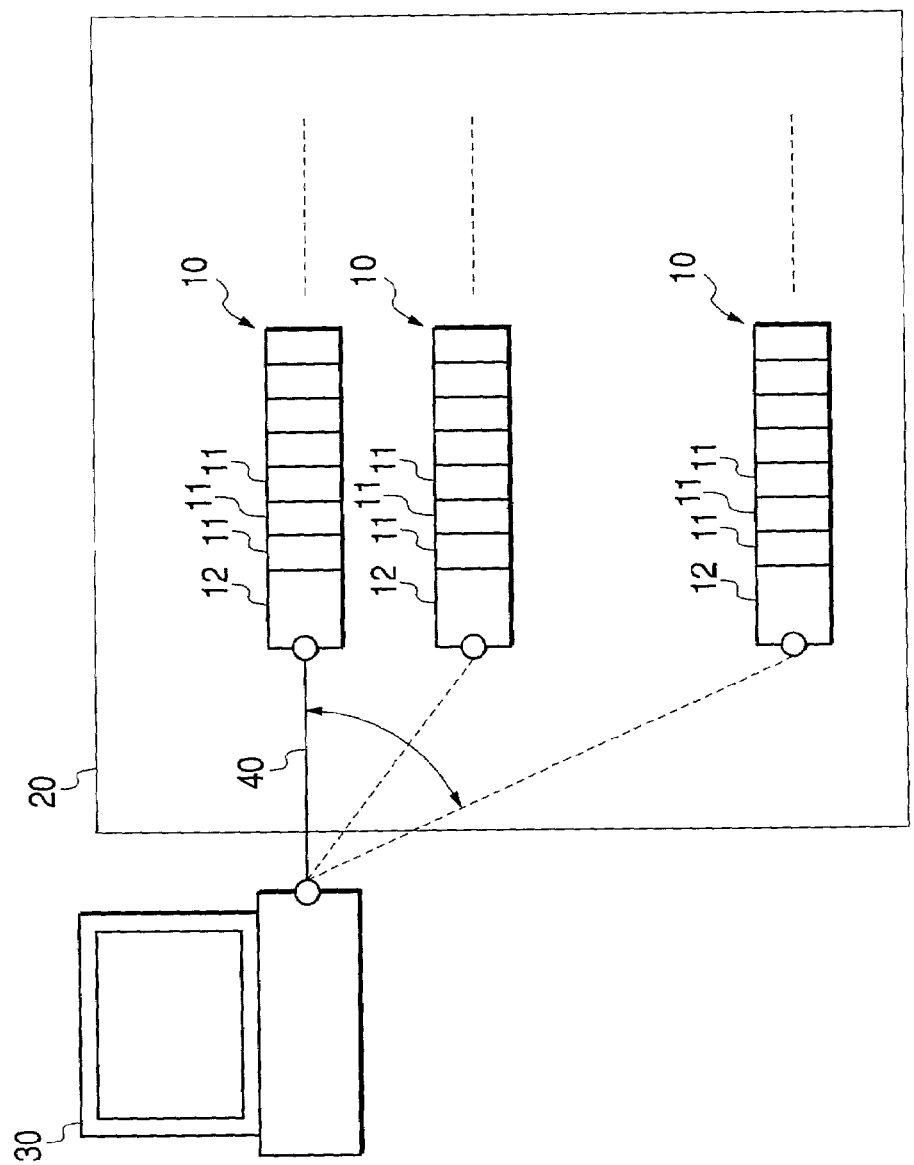
FIG. 1 is a schematic view showing a photoelectric sensor management system according to an embodiment of the present invention and a configuration of a system employing a plurality of photoelectric sensors.

FIG. 1 is a schematic view showing a photoelectric sensor management system according to one of embodiments of the present invention and a configuration of a system employing a plurality of photoelectric sensors.

In FIG. 1, pluralities of sensor blocks 10 are provided to one system 20. In the present embodiment, a photoelectric sensor includes an amplifier (sensor main body portion), and a head. A lens is fitted to the head as the case may be. A CPU (Central Processing Unit), an amplifier, an operation portion, a display portion, etc. are provided to the amplifier. Also, a light projection portion and a light receiving portion are provided to the head.

Each sensor block 10 includes one amplifier or plural amplifiers 11 and communication units 12. For example, 16 amplifiers 11 can be connected to the communication unit 12 of one sensor block 10 at maximum. One sensor block 10 is called one block in a following explanation.

A photoelectric sensor management system 30 in the present embodiment is connected selectively to the communication unit 12 of the sensor block 10 via a cable 40. This photoelectric sensor management system 30 is performed by a personal computer and a photoelectric sensor management program.

As described later, since the photoelectric sensor management system 30 communicates with the communication unit 12 of the sensor block 10 via the cable 40, such system can set information such as a set value (threshold value) of the amplifier 11, etc. in unit of block and also monitor the information such as the current quantity of a received light (referred to as the "current value" hereinafter), etc. The photoelectric sensor management system 30 can manage 16 sensor blocks 10 at maximum, i.e., 256 photoelectric sensors at maximum, for example.

Figure 2:
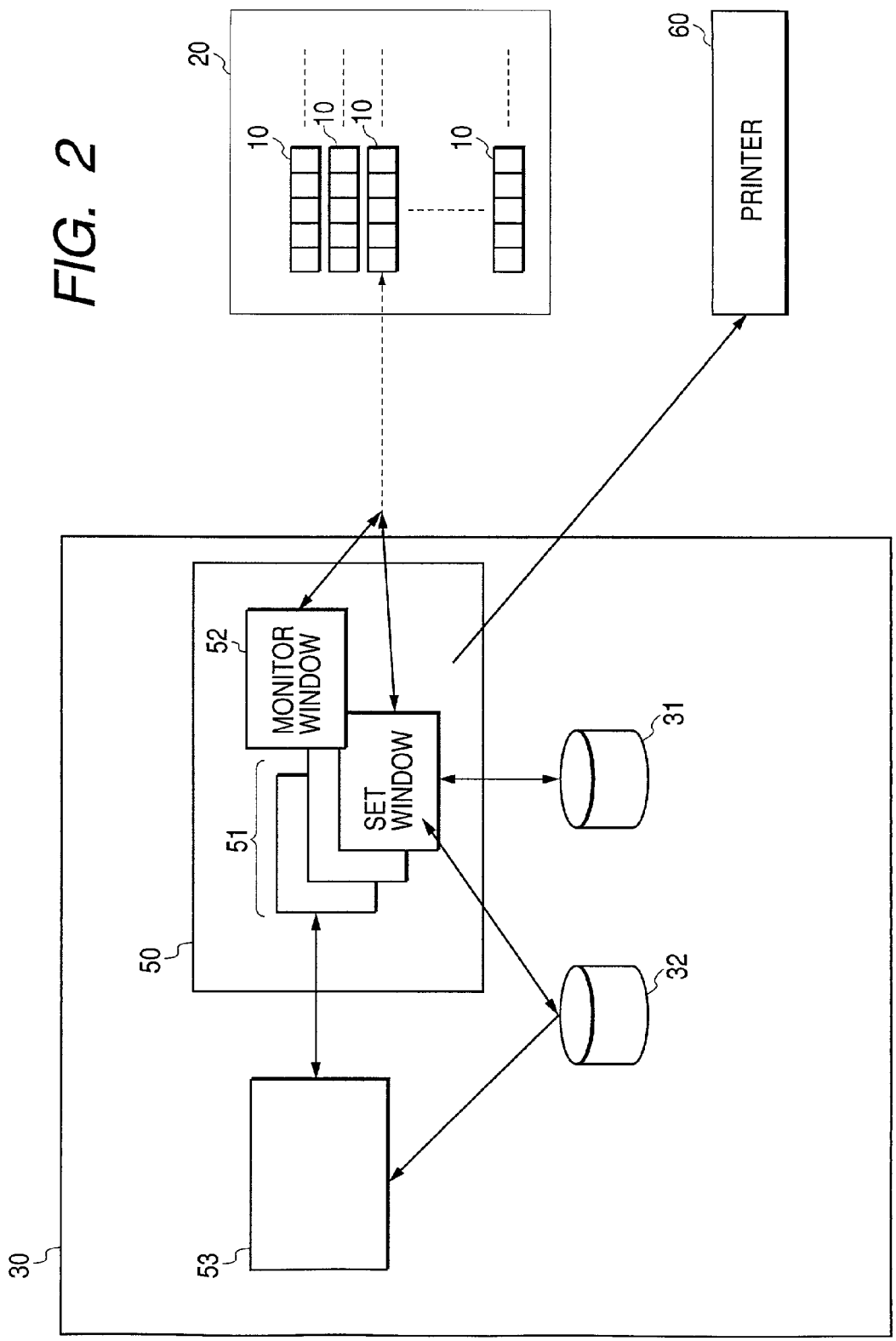
FIG. 2 is a view showing a concept of a photoelectric sensor management program in the photoelectric sensor management system.

FIG. 2 is a view showing a concept of a photoelectric sensor management program in the photoelectric sensor management system.

A photoelectric sensor management program 50 in the photoelectric sensor management system 30 displays a set window 51 and a monitor window 52 on a screen. The set window 51 includes a plurality of sheets, and each sheet corresponds to one sensor block 10. The set window 51 is displayed to set the information such as the set value of the amplifier 11, etc. included in a plurality of sensor blocks 10. Also, the monitor window 52 is displayed to monitor the information such as the current set value, the current value, etc. of each amplifier 11 included in the sensor blocks 10 that are currently connected.

Hereinafter, the information such as the set value, etc. set in the amplifier 11 are called the set information, and the information such as the current set value, the current value, etc. of the amplifier 11 are called the amplifier information. The set information is the information to define an operation of the amplifier 11, and the amplifier information includes the set information and the operation state of the amplifier 11.

The set information in the set window 51 is stored in a memory portion 31 as a document. Also, the contents of the set window 51 can be input into a spreadsheet application program 53 as a file. This file of the spreadsheet application program 53 can be saved in a memory portion 32. In addition, the contents of the set window 51 and the monitor window 52 can also be output to a printer 60.

Figure 3:
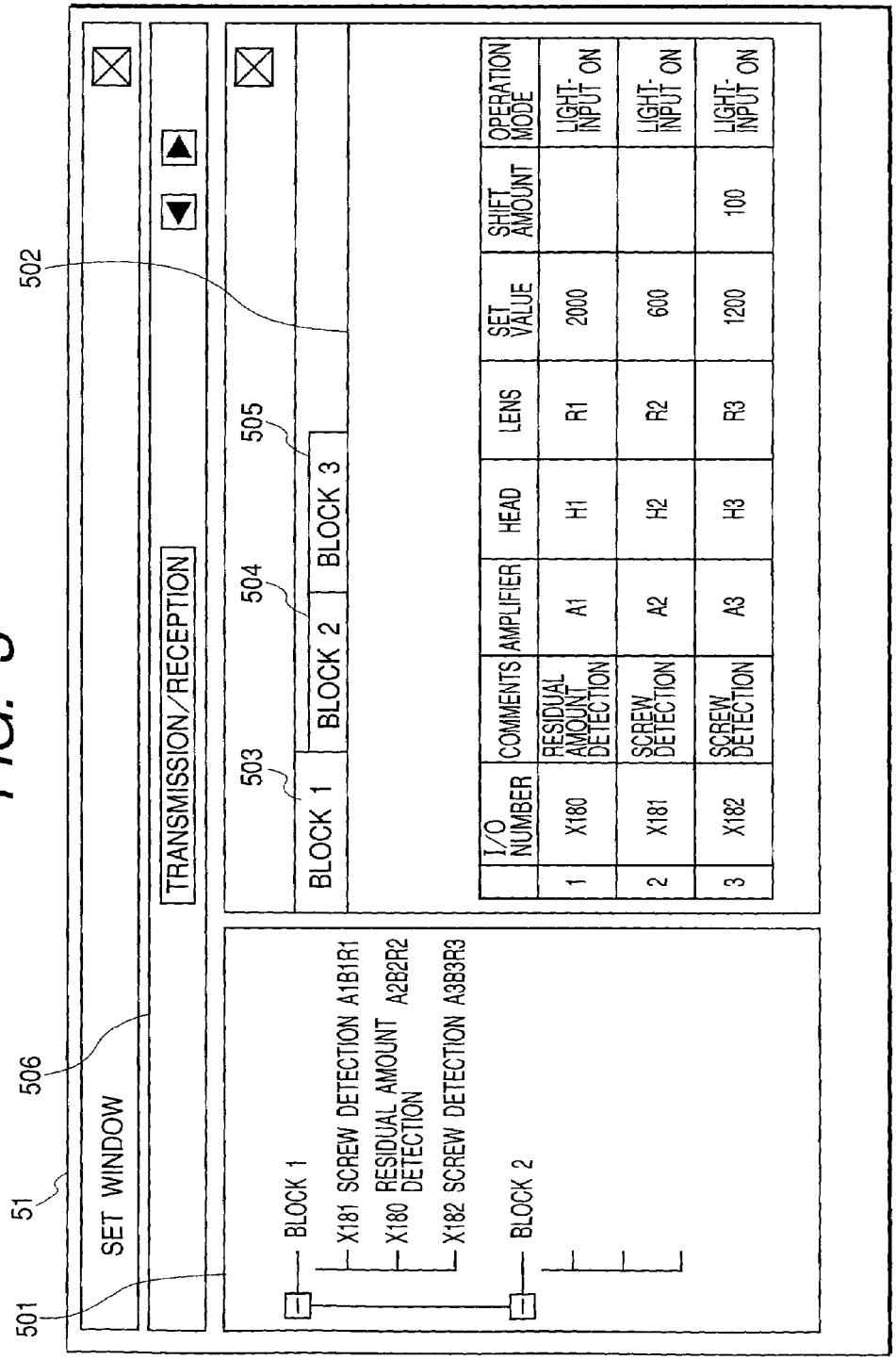
FIG. 3 is a view showing an example of a set window.

FIG. 3 is a view showing an example of the set window 51.

In the set window 51, the set information about a maximum of 16 amplifiers 11 in a maximum of 16 blocks can be edited collectively.

The set window 51 is composed of an amplifier list display area 501 and an amplifier information display area 502. In the amplifier list display area 501, a type of the amplifier, a type of a head, and a type of a lens included in each sensor block 10 as well as I/O (input/output) number and comments are displayed. Also, in the amplifier information display area 502, the set information of one amplifier or plural amplifiers 11 included in the selected sensor block 10 is displayed. In the example in FIG. 3, the set information of three amplifiers 11 of the block 1 is displayed by selecting a tab 503.

As the documents in the set window 51, concepts of "book", "sheet", "row", "column" and "cell" are present. One book includes the set information of plural amplifiers 11 connected to one system 20, and corresponds to one set window 51. One sheet includes the set information of the amplifiers 11 in one sensor block 10, and is selected by tabs 503, 504, 505 in the set window 51. One row includes the set information of one amplifier 11, and is displayed in one sheet. One column corresponds to one item of the set information of the amplifiers 11 displayed in one sheet. One cell corresponds to one set information of one amplifier 11 displayed in one sheet.

A sheet that corresponds to the system 20 being connected currently is called a current book. A sheet that corresponds to the sensor block 10 being connected currently is called the current sheet. A row in which a cursor is positioned is called a current row.

As the set information, there are the I/O number, the comments, the type of the amplifier, the type of the head, the type of the lens, the set value, the shift amount, the operation mode, the timer mode, the key lock, etc. Where the shift amount means an amount by which the set value is shifted if such set value is shifted and displayed, for example. As the operation mode, there are a light-input ON where a sensed signal is turned ON when the light being projected from the light projecting portion is input into the light receiving portion and a light-shielding ON where the sensed signal is turned ON when the light being projected from the light projecting portion is not input into the light receiving portion. As the timer, there are OFF-delay and ON-delay. The key lock signifies that the keys of the amplifier 11 are not allowed to set a part of functions.

Here, in some cases the settable functions are different according to the type of each amplifier 11. In this case, settable functions and not-settable functions for each amplifier 11 can be grasped as a list in the set window 51.

The set information can be transmitted/received between the set window 51 and the sensor block 10. In order to transmit/receive the set information, a "transmission/reception" button of a menu 506 is clicked and then a "transmission" or a "reception" in a pull-down menu is selected. Here, a dialog is opened and the unit of the transmission/reception can be selected. In the case of the unit of the system, the set information of the book being selected currently is transmitted/received. In the case of the unit of the block, the set information of the sheet being selected currently is transmitted/received. In the case of the unit of the amplifier, the set information of the row being selected currently is transmitted/received. If the unit of the system is selected, a message for advising the user to exchange the cable 40 is displayed until the transmission/reception are completed.

If the "transmission" is selected, the set information in the set window 51 is transmitted to the amplifier 11 of the sensor block 10. If the "reception" is selected, the set information of the amplifier 11 included in the sensor block 10 are received and then displayed in the set window 51.

In the set window 51, the editing operation such as cut, copy, paste, erase, row insertion, etc. can be executed by designating a row range. If the set information is updated by the editing operation, the documents stored in the memory portion 31 are updated based on the updated set information.

In this case, the edition of the set window 51 can be executed in the situation that the sensor block 10 is not connected to the photoelectric sensor management system 30.

Also, all the blocks or the currently selected block in the set window 51 can be printed by the printer 60.

FIG. 4 is a view showing an example of the monitor window 52.

The monitor window 52 displays the amplifier information of the amplifier 11 included in the sensor block 10 that is connected currently to the photoelectric sensor management system 30. The monitor window 52 is started in connection with the current sheet. When the monitor window 52 is started, the photoelectric sensor management system 30 acquires the amplifier information of the amplifier 11 from the sensor block 10, which is connected currently, via a communication.

As shown in FIG. 4, the monitor window 52 has an amplifier information area 521. An amplifier list box 522 is displayed in the amplifier information area 521.

A list of the amplifiers 11 included in the sensor block 10, which is connected currently to the photoelectric sensor management system 30, is displayed in the amplifier list box 522. The user can select the to-be-monitored amplifier 11 from the amplifiers 11 displayed in the amplifier list box 522. As a result, the amplifier information of the selected amplifier 11 can be acquired via the communication. In the upper area of the amplifier information area 521, the block number, the I/O number, the comments, the type of the amplifier, the type of the head, and the type of the lens of the selected amplifier 11 are displayed. In the example in FIG. 4, the amplifier 11 having the I/O number "×182" in the amplifier list box 522 is selected.

The amplifier information of the amplifier 11 selected in the amplifier list box 522 is displayed in the amplifier information area 521. As the amplifier information, there are the set value, the current value, the shift display value, the shift amount, the output state (ON or OFF of the sensed signal), the operation mode, the timer mode, the key lock, etc. As the display mode, the display of the set value and the current value, the % display and the display of the current value, a bar display and a display of the current value of the margin, a display of the peak value and a bottom value of the quantity of received light, and a display of the peak value (%) and the bottom value (%) can be switched. In this case, the margin can be calculated by (the current value)/(the set value)×100 (%).

A user can edit and update the set information such as the set value, the operation mode, etc. in the amplifier information area 521 of the monitor window 52. The updated set information is transmitted to the concerned amplifier 11 in the connected sensor block 10 in real time. Also, because sometimes the set value, the operation mode, etc. are changed on the amplifier 11 side, the photoelectric sensor management system 30 gets periodically the set information of each amplifier 11 of the connected sensor block 10 via the communication and then displays them on the monitor window 52. This monitor window 52 is closed by clicking a "close" button. In this case, if the set information of the connected sensor block 10 are updated, the contents of the sheet of the documents are updated and then stored in the memory portion 31 after the acknowledge message is displayed.

Figure 5:
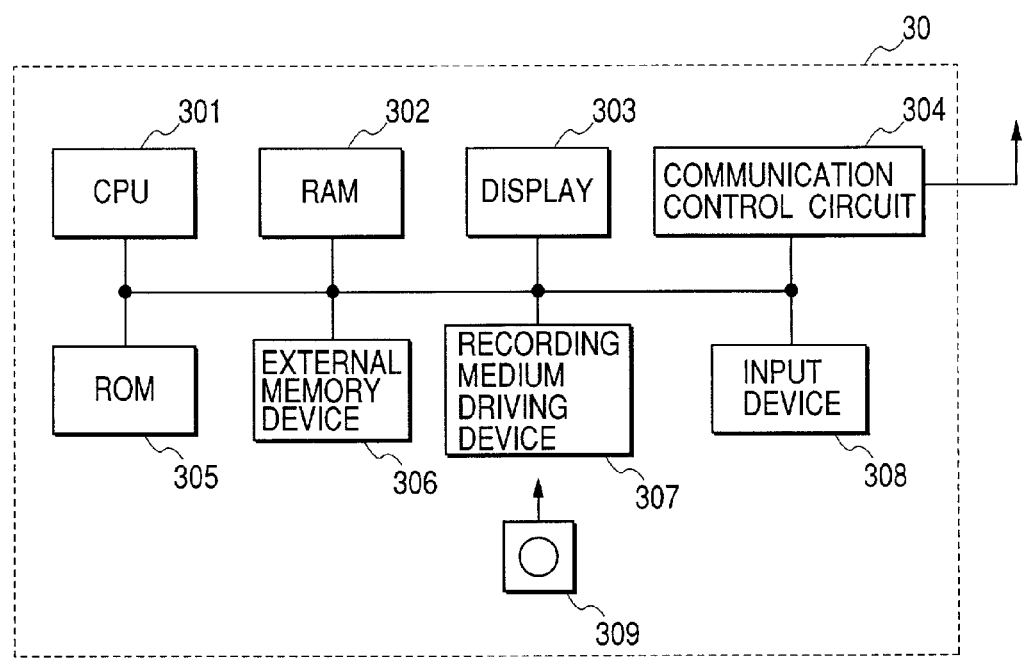
FIG. 5 is a block diagram showing a configuration of the photoelectric sensor management system.

Next, a configuration of the photoelectric sensor management system 30 will be explained with reference to FIG. 5 hereunder. FIG. 5 is a block diagram showing the configuration of the photoelectric sensor management system 30.

The photoelectric sensor management system 30 comprises a CPU (Central Processing Unit) 301, a RAM (Random Access Memory) 302, a display 303, a communication control circuit 304, a ROM (Read Only Memory) 305, an external memory device 306, a recording medium driving device 307, and an input device 308.

The communication control circuit 304 transmits/receives the set information and the amplifier information to/from the communication unit 12 of the sensor block 10. A system program is stored in the ROM 305. The recording medium driving device 307 includes a CD-ROM drive, a floppy disk drive, or the like to read/write the data from/to a recording medium 309 such as CD-ROM, a floppy disk, or the like. A photoelectric sensor management program is recorded in the recording medium 309. The external memory device 306 includes a hard-disk drive, or the like and stores the photoelectric sensor management program that is read from the recording medium 309 via the recording medium driving device 307. Also, the external memory device 306 is used as the memory portions 31, 32 in FIG. 2 and stores the above documents.

The CPU 301 executes the photoelectric sensor management program, which is stored in the external memory device 306, on the RAM 302. The display 303 displays the above set window 51 and the monitor window 52 on a screen. The input device 308 consists of a keyboard, a mouse, or the like, and is used to edit the set window 51 and the monitor window 52 displayed on the display 303.

In this case, as the recording medium 309 for recording the photoelectric sensor management program, various recording mediums such as the semiconductor memory like the ROM, etc., the hard disk, etc. can be employed. Also, the photoelectric sensor management program may be downloaded into the external memory device 306 via the communication medium such as the communication line, or the like and then may be executed on the RAM 302.

In the present embodiment, the input device 308 corresponds to a selecting means, the display 303 corresponds to a displaying means, the CPU 301 and the communication control circuit 304 correspond to a communicating means, the CPU 301, the display 303 and the input device 308 correspond to an updating means, the external memory device 306 corresponds to a storing means, and the display 303 which is also corresponding to a display means.

FIG. 5 is a top view of the amplifier 11 of the photoelectric sensor. On the amplifier 11, display devices 121, 122, an output display lamp 123, an up/down key 124, a mode key 125, and an L/D key (light-ON/dark-ON set key) 126 are provided.

The set value, the current value, etc. are displayed on the display devices 121, 122. The output displays lamp 123 displays ON and OFF of the sensed signal. For example, the output display lamp 123 is turned ON when the sensed signal is ON, while the output display lamp 123 is turned OFF when the sensed signal is OFF. The up/down key 124 is used to adjust the set value, etc. The mode key 125 is used to change the display mode, to switch the display mode and the parameter change mode, etc. In the parameter change mode, the change of the set states such as the operation mode change, the timer mode change, etc. can be executed. The L/D key 126 is used to switch the light-input ON (light ON) and the light-shielding ON (dark ON).

Figure 7:
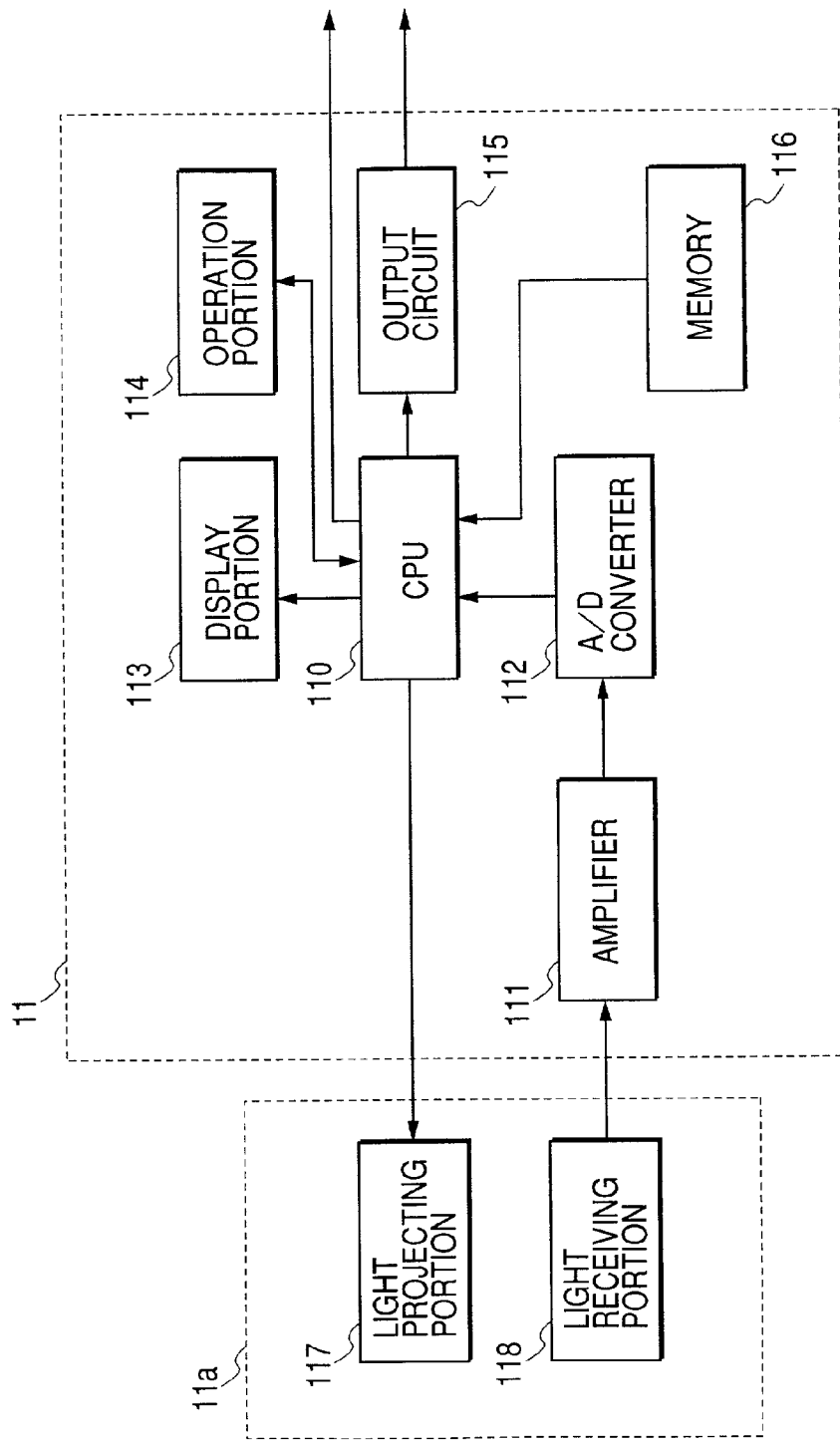
FIG. 7 is a block diagram showing a configuration of the photoelectric sensor.

FIG. 7 is a block diagram showing a configuration of the photoelectric sensor. As shown in FIG. 7, the photoelectric sensor includes the amplifier 11 and the head 11a. In FIG. 7, a reflection photoelectric sensor is shown as an example.

The amplifier 11 comprises a CPU 110, an amplifier 111, an A/D (Analog/Digital) converter 112, a display portion 113, an operation portion 114, an output circuit 115, and a memory 116. Also, the head 11a comprises a light projecting portion 117 and a light receiving portion 118.

Figure 6:
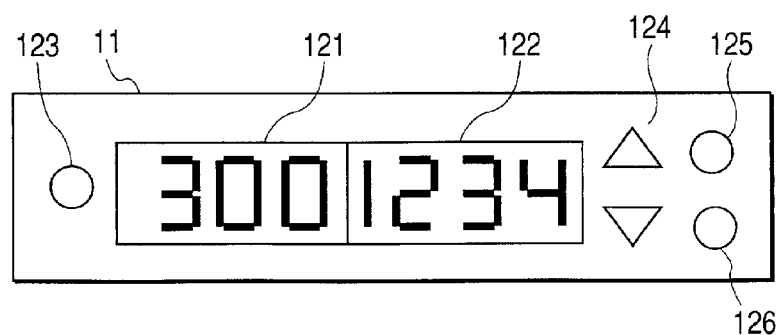
FIG. 6 is a top view of an amplifier of a photoelectric sensor.

The CPU 110 controls operations of the light projecting portion 117, the display portion 113, the operation portion 114, and the output circuit 115. The set information such as the set value, etc. are stored in the memory 116. The display portion 113 includes the display devices 121, 122 and the output display lamp 123 in FIG. 6, and the operation portion 114 includes the up/down key 124, the mode key 125, and the L/D key 126 in FIG. 6.

The light projecting portion 117 projects the laser beam on the sensing area. The light receiving portion 118 receives the reflected light from the sensing area, and outputs a received light signal in response to a quantity of received light. The amplifier 111 amplifies the received light signal output from the light receiving portion 118. The A/D converter 112 converts the received light signal being amplified by the amplifier 111 into the digital signal to give the signal to the CPU 110 as the current value.

The CPU 110 compares the current value given from the A/D converter 112 with the set value stored in the memory 116 to decide whether or not the to-be-sensed subject is present in the sensing area. If the operation mode is set to the light-input ON, the CPU 110 outputs the ON-state sensed signal via the output circuit 115 when the current value is higher than the set value, and then the CPU 110 causes the output display lamp 123 to display the ON state. If the operation mode is set to the light-shielding ON, the CPU 110 outputs the ON-state sensed signal via the output circuit 115 when the current value is lower than the set value, and then the CPU 110 causes the output display lamp 123 to display the ON state. Also, the CPU 110 causes the display devices 121, 122 to display the set value, the current value, etc. based on the operation of the mode key 125. Also, the CPU 110 adjusts the set information such as the set value, etc. displayed on the display devices 121, 122 based on the operation of the up/down key 124. In addition, the CPU 110 causes to store the set information displayed on the display devices 121, 122 in the memory 116 when the display of the display devices 121, 122 is switched based on the operation of the mode key 125.

Also, the CPU 110 causes to store the set information transmitted from the photoelectric sensor management system 30 via the communication unit 12 in the memory 116, and also transmits the amplifier information such as the set value stored in the memory 116, the current value given from the A/D converter 112, etc. to the photoelectric sensor management system 30 via the communication unit 12.

Then, a communication operation between the photoelectric sensor management system 30 and the sensor block 10 will be explained hereunder.

The data being transmitted from the photoelectric sensor management system 30 to the sensor block 10 consist of a command code and parameters. The command code is a code representing operation types. Also, the parameters include the number indicating to which amplifier 11 the instruction is issued, the transmitted/received data type, the upper bit of the transmitted data, the lower bit of the transmitted data, etc.

The data being transmitted from the sensor block 10 to the photoelectric sensor management system 30 includes a plurality of parameters. If the command code issued from the photoelectric sensor management system 30 is the instruction issued to the single amplifier 11 of the sensor block 10, the parameters include the upper bit of the response data, the lower bit of the response data, etc. If the command code issued from the photoelectric sensor management system 30 is the instruction issued to plural amplifiers 11 of the sensor block 10, the parameters include the upper bit of the response data, the lower bit of the response data, etc. of respective amplifiers 11.

Figure 8:
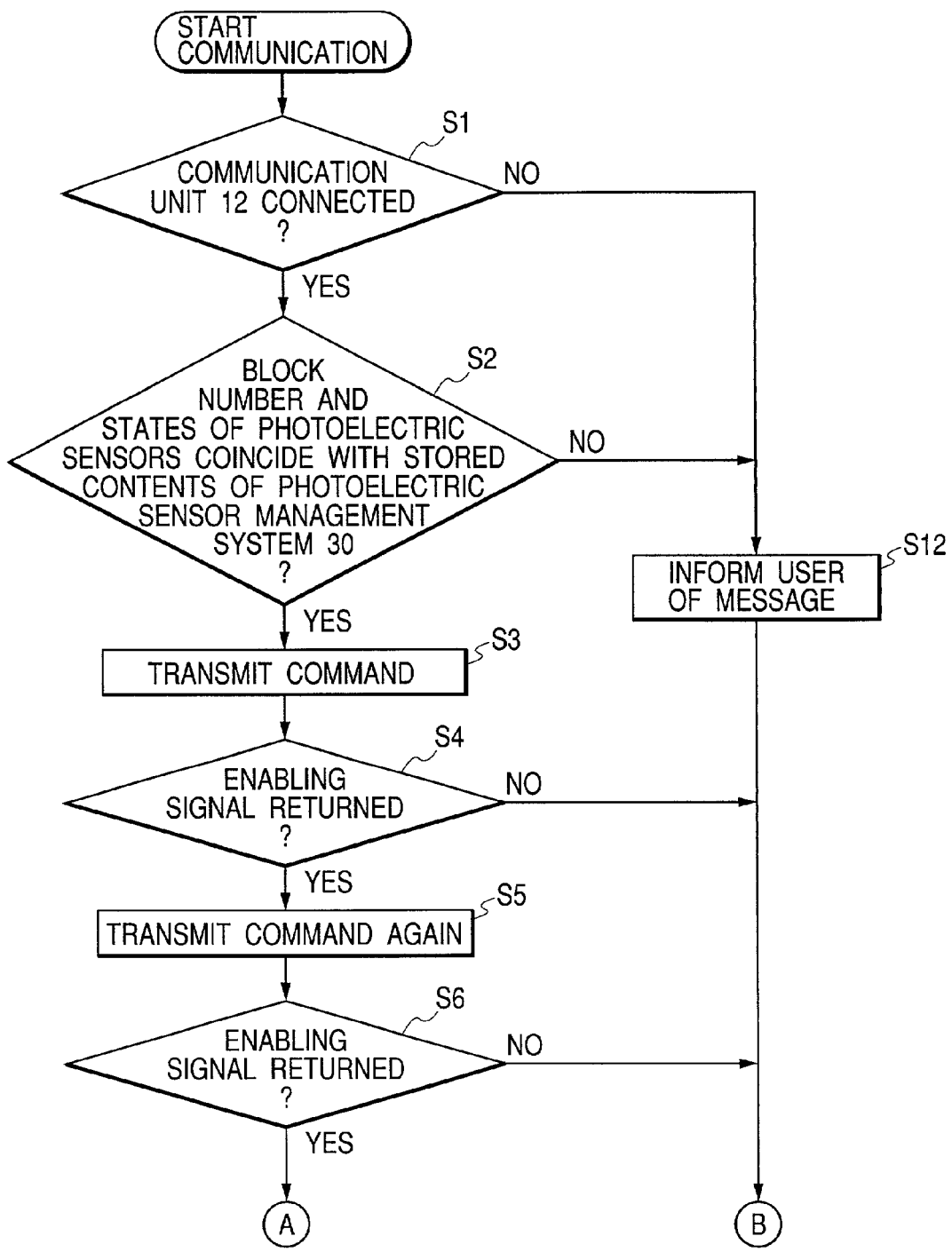
FIG. 8 is a flowchart showing an operation of reading data from a sensor block to the photoelectric sensor management system according to a photoelectric sensor management program.
Figure 9:
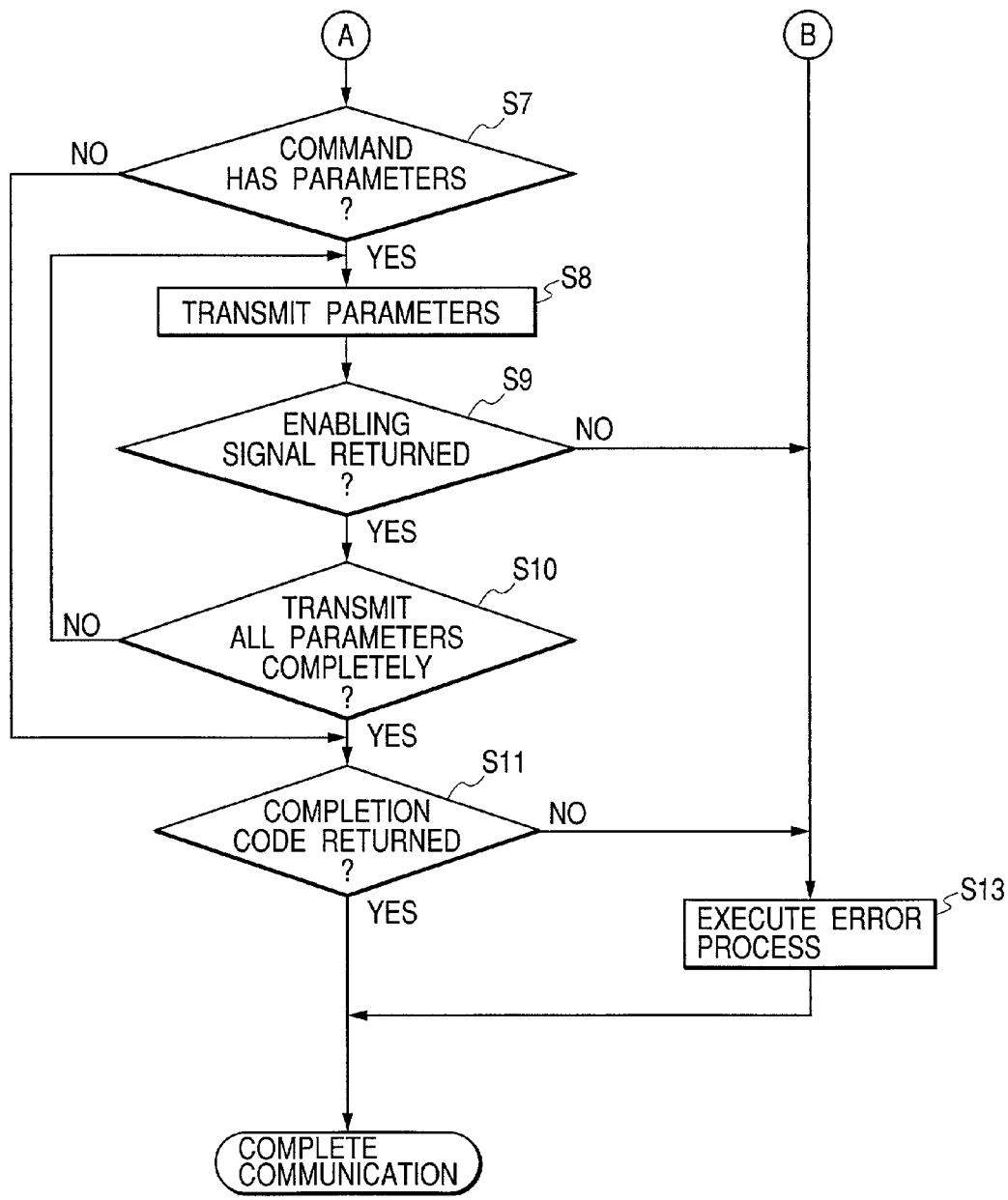
FIG. 9 is a flowchart showing the operation of reading the data from the sensor block to the photoelectric sensor management system according to the photoelectric sensor management program.

FIG. 8 and FIG. 9 are flowcharts showing an operation of reading the data from the sensor block 10 to the photoelectric sensor management system 30 according to the photoelectric sensor management program.

First, the CPU 301 of the photoelectric sensor management system 30 decides whether or not the communication unit 12 of the sensor block 10 is connected to this system 30 (step S1). If the communication unit 12 of the sensor block 10 is not connected to this system 30, the CPU 301 informs the user of this effect by issuing a message (step S12).

If the communication unit 12 is connected to this system 30, it is decided whether or not the block number and the states of the photoelectric sensors (the type of the amplifier 11, etc.) of the connected sensor block 10 coincide with the stored contents of the photoelectric sensor management system 30 (step S2). Unless the block number and the states of the photoelectric sensors of the connected sensor block 10 coincide with the stored contents of the photoelectric sensor management system 30, the CPU 301 informs the user of this effect by issuing the message (step S12).

If the block number and the states of the photoelectric sensors of the connected sensor block 10 coincide with the stored contents of the photoelectric sensor management system 30, the CPU 301 transmits the command to the communication unit 12 of the sensor block 10 via the communication control circuit 304 (step S3). Then, it is decided whether or not the enabling signal is returned from the communication unit 12 of the sensor block 10 (step S4).

If the enabling signal is returned from the communication unit 12 of the sensor block 10, the CPU 301 transmits the command again the communication unit 12 of the sensor block 10 via the communication control circuit 304 (step S5). Then, it is decided whether or not the enabling signal is returned from the communication unit 12 of the sensor block 10 (step S6). In this case, the reliability in communication can be assured by transmitting the command twice.

If the enabling signal is returned from the communication unit 12 of the sensor block 10, the CPU 301 decides whether or not the command has the parameters (step S7). If the command has no parameter, the process goes to step S11.

If the command has the parameters, the CPU 301 transmits the parameters to the communication unit 12 of the sensor block 10 via the communication control circuit 304 (step SB). Then, it is decided whether or not the enabling signal is returned from the communication unit 12 of the sensor block 10 (step S9).

If the enabling signal is returned from the communication unit 12 of the sensor block 10, the CPU 301 decides whether or not the transmission of all parameters has been completed (step S10). Unless the transmission of all parameters has been completed, the process goes back to step S8 and then the processes in steps S9, S10 are repeated.

If the transmission of all parameters has been completed, the CPU 301 decides whether or not a completion code is returned from the communication unit 12 of the sensor block 10 (step S11). If the completion code is returned, the process is ended.

If the enabling signal is not returned in steps S4, S6, S9 or if the completion code is not returned in step S11, the CPU 301 executes the error process (step S13).

Figure 10:
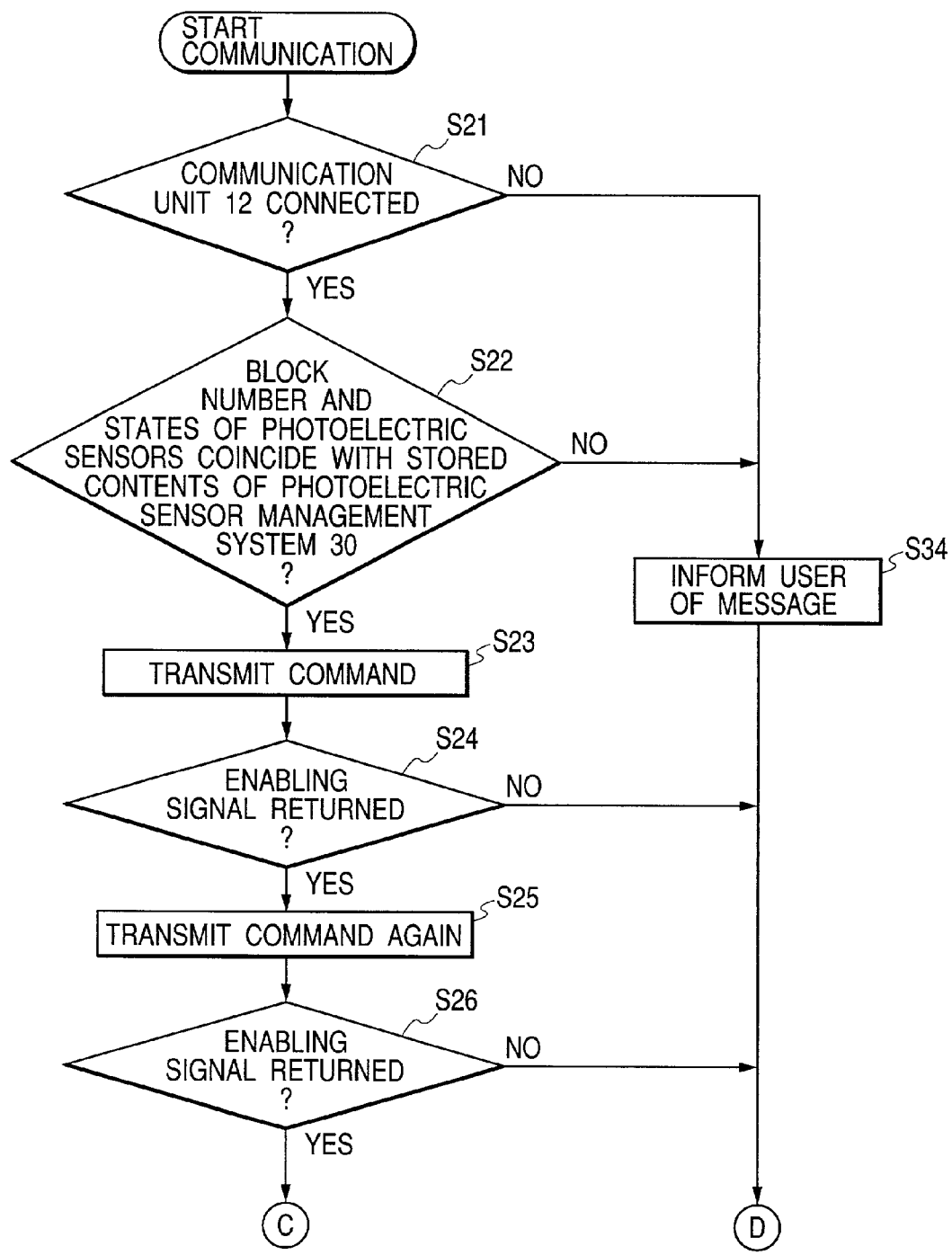
FIG. 10 is a flowchart showing an operation of writing data from the photoelectric sensor management system into the sensor block according to the photoelectric sensor management program.
Figure 11:
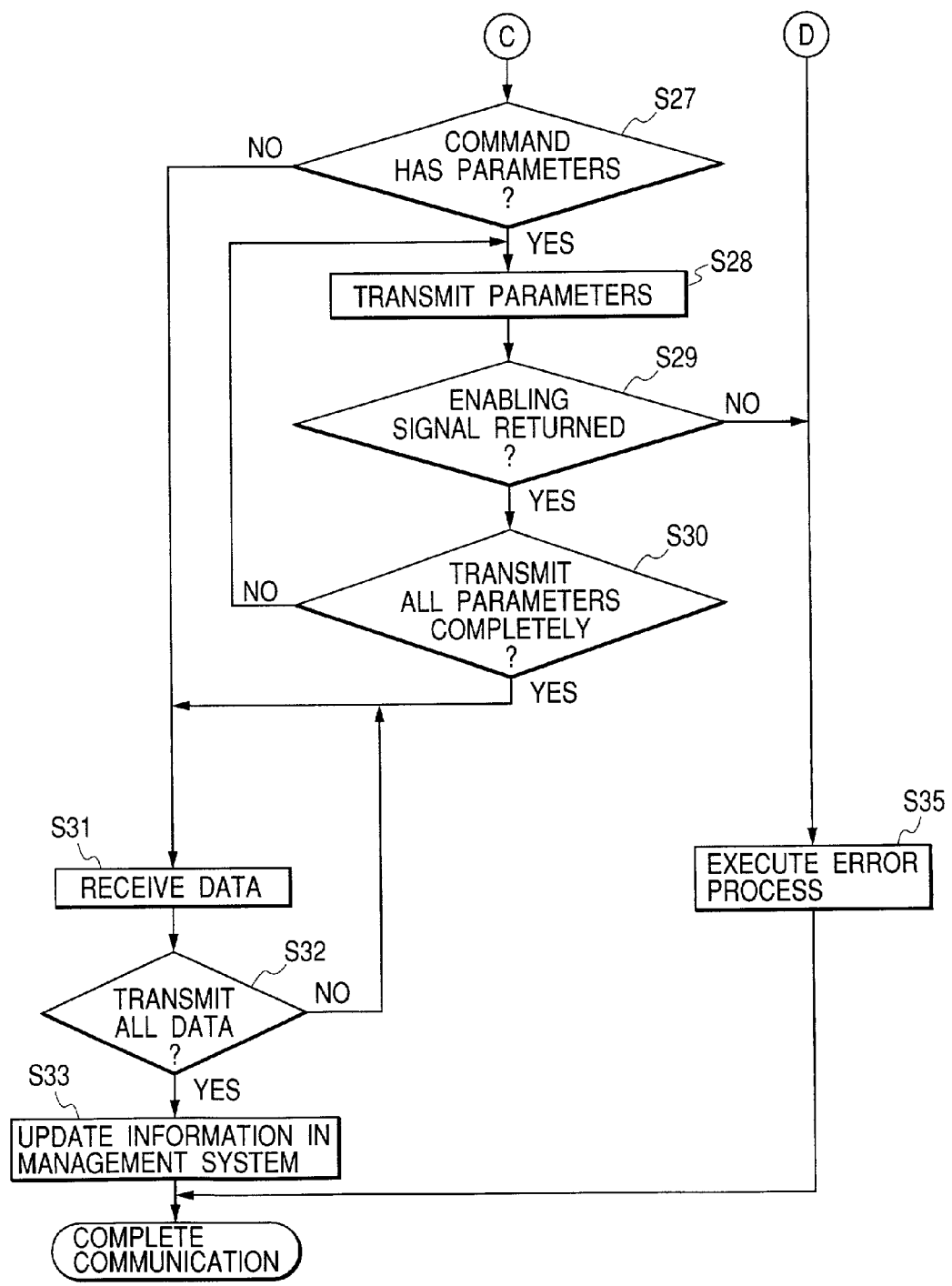
FIG. 11 is a flowchart showing the operation of writing the data from the photoelectric sensor management system into the sensor block according to the photoelectric sensor management program.

FIG. 10 and FIG. 11 are flowcharts showing an operation of writing the data from the photoelectric sensor management system 30 into the sensor block 10 according to the photoelectric sensor management program.

First, the CPU 301 of the photoelectric sensor management system 30 decides whether or not the communication unit 12 of the sensor block 10 is connected to this system 30 (step S21). If the communication unit 12 of the sensor block 10 is not connected to this system 30, the CPU 301 informs the user of this effect by issuing the message (step S34).

If the communication unit 12 is connected to this system 30, it is decided whether or not the block number and the states of the photoelectric sensors (the type of the amplifier 11, etc.) of the connected sensor block 10 coincide with the stored contents of the photoelectric sensor management system 30 (step S22). Unless the block number and the states of the photoelectric sensors of the connected sensor block 10 coincide with the stored contents of the photoelectric sensor management system 30, the CPU 301 informs the user of this effect by issuing the message (step S34).

If the block number and the states of the photoelectric sensors of the connected sensor block 10 coincide with the stored contents of the photoelectric sensor management system 30, the CPU 301 transmits the command to the communication unit 12 of the sensor block 10 via the communication control circuit 304 (step S23). Then, it is decided whether or not the enabling signal is returned from the communication unit 12 of the sensor block 10 (step S24).

If the enabling signal is returned from the communication unit 12 of the sensor block 10, the CPU 301 transmits the command once again the communication unit 12 of the sensor block 10 via the communication control circuit 304 (step S25). Then, it is decided whether or not the enabling signal is returned from the communication unit 12 of the sensor block 10 (step S26). In this case, the reliability in communication can be assured by transmitting the command two times.

If the enabling signal is returned from the communication unit 12 of the sensor block 10, the CPU 301 decides whether or not the command has the parameters (step S27). If the command has no parameter, the process goes to step S31.

If the command has the parameters, the CPU 301 transmits the parameters to the communication unit 12 of the sensor block 10 via the communication control circuit 304 (step S28). Then, it is decided whether or not the enabling signal is returned from the communication unit 12 of the sensor block 10 (step S29).

If the enabling signal is returned from the communication unit 12 of the sensor block 10, the CPU 301 decides whether or not the transmission of all parameters has been completed (step S30). Unless the transmission of all parameters has been completed, the process goes back to step S28 and then the processes in steps S29, S30 are repeated.

If the transmission of all parameters has been completed, the CPU 301 receives the data from the communication unit 12 of the sensor block 10 (step S31). Then, it is decided whether or not all the data have been transmitted (step S32). Unless all the data have been transmitted, the process goes back to step S31 and then the processes in steps S31, S32 are repeated. If all the data have been transmitted, the amplifier information of the photoelectric sensor management system 30 is updated based on the received data (step S33). Then, the process is ended.

If the enabling signal is not returned in steps S24, S26, S29, the CPU 301 executes the error process (step S35).

As described above, in the photoelectric sensor management system 30 of the present embodiment, the amplifier information of respective amplifiers 11 included in the sensor block 10 is displayed in the monitor window 52. Accordingly, the amplifier information of individual amplifiers 11 in the sensor block can be easily monitored in real time.

Also, the set information of the amplifiers 11 displayed in the monitor window 52 can be updated, and then the updated set information can be transmitted. Therefore, the amplifier information of individual amplifiers 11 in the sensor block can be easily updated.

In addition, a list of the amplifiers 11 included in the connected sensor block 10 is displayed in the monitor window 52. Therefore, the user can readily know the amplifier 11 that is connected currently, and thus the user can easily select the to-be-monitored amplifier 11.

Also, in the photoelectric sensor management system 30 of the present embodiment, the set information displayed in the set window 51 are broadcasted to a plurality of amplifiers 11 included in the sensor block 10. Therefore, the set information can be set collectively to a plurality of amplifiers 11 included in the sensor block 10, and also the set information that are set can be easily updated.

Also, the set information of a plurality of sensor blocks 10, which are displayed on the set window 51, are stored in the memory portion 31 as the document. Therefore, the set information of any sensor block 10 can be selected from the set information of a plurality of sensor block 10 stored in the memory portion 31, and then transmitted collectively to the concerned sensor block 10.

In the above embodiment, the case where the present invention is applied to the photoelectric sensor management system and the photoelectric sensor management program, which manage a photoelectric sensor group including a plurality of photoelectric sensors, is explained. But the present invention is not limited to the photoelectric sensor group. The present invention can be applied to a sensor management system and a sensor management program, which manage another sensor group such as a magnetic sensor group including a plurality of magnetic sensors, a ultrasonic sensor group including a plurality of ultrasonic sensors, etc.

What is claimed is:

1. A sensor management system connected to two or more sensor groups, wherein each sensor group includes one or more sensors the sensor management system comprising:
   a selecting means for selecting any one of the sensor groups connected to the sensor management system;
   a communicating means for communicating with the one sensor group selected by the selecting means so that the communicating means acquires sensor information including information for defining an operation of the one sensor group and information to indicate an operation state of the one sensor group;
   a displaying means for displaying the sensor information acquired by the communicating means,
   wherein at least one of the sensors in at least one sensor group comprises a photoelectric sensor comprising a light projection portion and a light receiving portion; and
   wherein the displaying means includes a first screen for displaying the sensor information concerning the sensors included in the sensor group that is selected by the selecting means; and
   a second screen for displaying, when at least one of the sensors included in the sensor group that is displayed in the first screen is selected, the sensor information concerning the selected sensors, and for providing a display to configure the sensor information.

2. The sensor management system according to claim 1, further comprising:
   an updating means for updating information sent to the one sensor out of the sensor information displayed by the displaying means; and
   wherein the communicating means transmits the information updated by the updating means to the one sensor.

3. The sensor management system according to claim 2, wherein the communicating means acquires identification information, which identifies the one sensor connected to the sensor management system, via communication, and wherein the displaying means displays the identification information acquired by the communicating means, the selecting means selects the one sensor based on the identification information displayed by the displaying means.

4. The sensor management system according to claim 1, wherein the communicating means acquires identification information, which identifies the one sensor connected to the sensor management system, via communication, and wherein the displaying means displays the identification information acquired by the communicating means, the selecting means selects the one sensor based on the identification information displayed by the displaying means.

5. The sensor management system according to claim 1, wherein the sensor information for each of the sensors includes two or more of the following:
   a) a threshold value that is configured for an amount of light received by the sensor;
   b) a sensor operation mode that is selectable from a ON-when-light-received mode in which a detection signal is switched on when the sensor receive light, and an ON-when-light-shielded mode in which the detection signal is switched on when the sensor is switched on when the light to be received by the sensor is shielded;
   c) a type of the sensor;
   d) a timer mode; or
   e) a key lock concerning a lock-unlock state of the operation key for the sensor.

6. The sensor management system according to claim 1, wherein the second screen is configurable to be displayed in a mode selected from a plurality of displaying modes.

7. The sensor management system according to claim 6, wherein the plurality of displaying modes includes two or more of the following:
   a) a first mode for displaying a threshold value configured for the sensor and an amount of light presently received by the sensor;
   b) a second mode for displaying a peak value and a bottom value of an amount of light received by the sensor; or
   c) a third mode for displaying a margin amount and the amount of light presently received by the sensor.

8. The sensor management system according to claim 1, wherein the second screen displays a displaying portion in which an amount of light received by each of the sensors and the threshold value for each of the sensors are displayed, and an operating portion for configuring sensor parameters including the threshold value.

9. A computer-readable medium including a sensor management program connectable to a sensor group including a plurality of sensors, the sensor management program comprising:
   a process for selecting any one of the plurality of sensors connected to the sensor management system;
   a process for acquiring sensor information including information to defining an operation of the one sensor and information for indicating an operation state of the one sensor by communicating with the selected one sensor; and
   a process for displaying the acquired sensor information, wherein the sensor management program is executed by a computer,
   wherein at least one of the plurality of sensors comprises a photoelectric sensor comprising a light projection portion and a light receiving portion.

10. The computer-readable program according to claim 9, the sensor management program further comprises:
    a process for updating information sent to the one sensor out of the displayed sensor information; and
    a process for transmitting the updated information to the one sensor, wherein the sensor management program is executed by the computer.

11. The sensor management program according to claim 10, wherein the process for selecting any one of the plurality of sensors includes a process for acquiring identification information, which identifies the plurality of sensors connected to the sensor management system, via communication, a process for displaying the acquired identification information, and a process of selecting any one of the one sensor based on the displayed identification information.

12. The sensor management program according to claim 9, wherein the process for selecting any one of the plurality of sensors includes a process for acquiring identification information, which identifies the plurality of sensors connected to the sensor management system, via communication, a process for displaying the acquired identification information, and a process of selecting any one of the one sensor based on the displayed identification information.

13. A sensor management system connected to two or more sensor groups, wherein each sensor group includes one or more sensors, the sensor management system comprising:
- a storing means for storing information sent to define an operation of the plurality of sensors as set information;
- a displaying means for displaying set information stored in the storing means;
- an updating means for updating set information displayed by the displaying means and updating the set information stored in the storing means; and
- a communicating means for transmitting the set information displayed by the displaying means to the plurality of sensors wherein at least one of the sensors in at least one sensor group comprises a photoelectric sensor comprising a light projection portion and a light receiving portion;

wherein the displaying means includes a first screen for displaying the sensor information concerning the sensors included in the sensor group that is selected by the selecting means; and a second screen for displaying, when at least one of the sensors included in the sensor group that is displayed in the first screen is selected, the sensor information concerning the selected sensors, and for providing a display to configure the sensor information.

14. The sensor management system according to claim 13, wherein the sensor management system connects to at least one of the sensor groups, the storing means stores the set information at each of the sensor groups, the displaying means displays the set information of the selected one sensor group out of the stored set information, and the communicating means transmits collectively the set information displayed by the displaying means to the one sensor group.

15. The sensor management system according to claim 13, wherein the sensor information for each of the sensors includes two or more of the following:
- a) a threshold value that is configured for an amount of light received by the sensor;
- b) a sensor operation mode that is selectable from a ON-when-light-received mode in which a detection signal is switched on when the sensor receive light, and an ON-when-light-shielded mode in which the detection signal is switched on when the sensor is switched on when the light to be received by the sensor is shielded;
- c) a type of the sensor;
- d) a timer mode; or
- e) a key lock concerning a lock-unlock state of the operation key for the sensor.

16. The sensor management system according to claim 13, wherein the second screen is configurable to be displayed in a mode selected from a plurality of displaying modes.

17. The sensor management system according to claim 16, wherein the plurality of displaying modes includes two or more of the following:
- a) a first mode for displaying a threshold value configured for the sensor and an amount of light presently received by the sensor;
- b) a second mode for displaying a peak value and a bottom value of an amount of light received by the sensor; or
- c) a third mode for displaying a margin amount and the amount of light presently received by the sensor.

18. The sensor management system according to claim 13, wherein the second screen displays a displaying portion in which an amount of light received by each of the sensors and the threshold value for each of the sensors are displayed, and an operating portion for configuring sensor parameters including the threshold value.

19. A computer-readable medium including a sensor management program connectable to at least one of sensor groups including a plurality of sensors, the sensor management program comprising:
- a process for storing information sent to define an operation of the plurality of sensors as set information;
- a process for displaying the stored set information;
- a process for updating the displayed set information and the stored set information;
- a process for transmitting the displayed set information to the plurality of sensors, wherein the sensor management program is executed by a computer and wherein at least one of the plurality of sensors comprises a photoelectric sensor comprising a light projection portion and a light receiving portion.

20. The computer-readable medium according to claim 19, wherein the computer is connected to at least one of the sensor groups, the process for storing includes a process for storing the set information at each of the sensor groups, the process for displaying includes a process for displaying the set information of the selected one sensor group out of the stored set information, and the process for transmitting includes a process for collectively transmitting the displayed set information to the sensor.

* * * * *